United States Patent
Poon et al.

[11] Patent Number: 6,134,131
[45] Date of Patent: Oct. 17, 2000

[54] CURRENT DRIVEN SYNCHRONOUS RECTIFIER WITH ENERGY RECOVERY

[75] Inventors: Ngai Kit Frankie Poon; Chui Pong Joe Liu; Man Hay Bryan Pong; Xue Fei Xie, all of Hong Kong, China

[73] Assignee: University of Hong Kong, Hong Kong, China

[21] Appl. No.: 09/267,828

[22] Filed: Mar. 12, 1999

[51] Int. Cl.[7] .......................... H02M 7/217; H02M 3/335

[52] U.S. Cl. .............................. 363/127; 363/18; 363/19; 363/21

[58] Field of Search ............................... 363/127, 15, 18, 363/19, 20, 21, 44, 84, 125

[56] References Cited

U.S. PATENT DOCUMENTS

| | | | |
|---|---|---|---|
| 3,757,195 | 9/1973 | Sklaroof | 363/127 |
| 3,940,682 | 2/1976 | Park et al. | 363/127 |
| 4,882,646 | 11/1989 | Genuit | 361/42 |

*Primary Examiner*—Peter S. Wong
*Assistant Examiner*—Rajnikant D. Patel
*Attorney, Agent, or Firm*—Pennie & Edmonds LLP

[57] ABSTRACT

A synchronous rectifier is disclosed which makes use of current driving technique to enable low conduction loss in converter rectifiers. In addition to a low loss switch the present invention comprises essentially a transformer with a plurality of windings with at least one current sensing winding, one driver winding which provides driving signal for the synchronous rectifier, and windings for energy recovery. This synchronous rectifier is self-driven but operates independent of converter input voltage hence allow wide input voltage range. It also avoids effect of leakage inductance in converter transformer windings. With energy recovery means it can operate with high efficiency. This synchronous rectifier can operate in many different circuit topologies.

6 Claims, 8 Drawing Sheets

CURRENT DRIVEN SYNCHRONOUS RECTIFIER WITH ENERGY RECOVERY

FIELD OF THE INVENTION

This invention relates to the field of switch mode power converters, in particular the field of synchronous rectification for high efficiency converters.

BACKGROUND OF THE INVENTION

Modern integrated logic circuits and microprocessors require high power at low voltage, and this presents considerable challenges to power supply engineers. High power at low voltage is usually associated with high current. In most power converter, there is at least one diode rectifier connected in series with the converter output. The forward voltage drop of rectifier diodes becomes significant when the output voltage is low. The output voltage of modern power converters for computers can be 2.2V or less while the forward voltage drop of a silicon diode is 0.7V. High output current produces a lot of losses in these output rectifier diodes. Such losses reduce efficiency of low voltage converters significantly.

A common way to reduce losses in an output rectifier is to replace it by a transistor, which is known as a synchronous rectifier. This makes use of the low forward voltage drop of a transistor, like a MOSFET, which can reduce losses significantly. However, a transistor is an active device that needs to be driven. It has to be given a driving signal in synchronism with the time at which it is required to turn on. This becomes an important issue in synchronous rectifier.

In a forward converter, a popular prior art synchronous rectifier makes use of the secondary winding of the main transformer as a means for driving the synchronous rectifier. The gates of the synchronous MOSFETs are connected to two terminals of the main transformer secondary winding. Alternating voltage at the secondary winding drives the MOSFET in synchronism with the converter main switch. This method is simple but vulnerable to input line voltage variation. At high input voltage the secondary transformer voltage may be too high for the MOSFET gates while at low input voltage the secondary transformer voltage may not be sufficient to drive the MOSFET gates. This limits the input voltage range of such converters. On the other hand, leakage inductance of the main transformer brings about a time period in which the body diodes of both synchronous MOSFETs conduct simultaneously while there are no gate drive voltages. MOSFET body diodes has high forward voltage drop and dissipation in this time period becomes significant especially at high converter switching frequency. Therefore this type of self-driven synchronous rectifier has limitations in its input voltage range, converter switching frequency and efficiency.

A lot of researchers attempted to tackle the problem of driving synchronous rectifier. In U.S. Pat. No. 5,179,512, Fisher invented a gate drive circuit for synchronous rectifier but it can only be used in resonant converters. In U.S. Pat. Nos. 5,126,615 and 5,457,624, Gauen and Hastings respectively invented drive circuits but they can be applied to non-isolated buck converters only. In U.S. Pat. No. 5,303,138 Rozman invented gate drive circuits but did not solve the problem of wide input voltage range. In U.S. Pat. No. 5,097,403 Smith used current sense rectifiers and electronic circuitry to detect current but it is applicable to MOSFET devices with current sense facility only. In U.S. Pat. No. 4,922,404 Ludwig went into the complexity of using a microprocessor to drive synchronous rectifiers.

SUMMARY OF THE INVENTION

The present invention encompasses means for rectifying current in a selected branch of an electronic circuit in an efficient manner. It makes use of low loss MOSFET and with associated circuitry it is equivalent to a low loss diode. Conduction of the MOSFET is controlled by current flowing through the apparatus. Energy is recovered from the current sensing means to ensure high efficiency.

In particular, a basic embodiment of the present invention comprises a low loss active switching device with parallel diode such as a MOSFET, a transformer with a plurality of windings, two diodes which are connected to a voltage source generally available in the application circuit concerned. A first winding of the transformer is coupled in series with the device, there is no difference whether the first winding is placed in series with the "Anode" or "Cathode" of the equivalent low loss diode constructed by the active switch. A second winding of the transformer is coupled with the control terminal of the switching device. A third and a fourth winding of the transformer each with a series diode are coupled in parallel a voltage source, which is most likely the output of a converter.

This embodiment provides a self-synchronized drive circuit which generally make an electronic switch, e.g. MOSFET, perform like a rectifier which allows current flow in one direction only but with much lower loss when compared to a diode.

Current flow through the synchronous rectifier apparatus is employed to generate driving signal for its own active switching device. The phase of the second winding is arranged to produce an ON or positive driving signal to turn the switching device on only when current flowing through the first winding is in the on or forward direction. To enhance driving performance a high speed electronic buffer which provides high input impedance and low output impedance may be inserted between the second winding and the control terminal of the switching device. Current driven technique ensures that turning on and off of the synchronous rectifier is independent of converter input voltage.

Voltage applied to the control terminal of the switching device has to be limited to avoid damage to the switching device. Voltage clamping is provided by coupling excessive charge through the second and third winding of the transformer to said voltage source. Voltage limit is controlled by the ratio of the second and third winding together with the magnitude of the voltage source. A diode is placed in series with the third winding to make sure the clamping is effective during the turn-on period. By this technique the driving signal can operate in all input voltage range. Excessive energy in the first winding of the transformer can be transferred to the said voltage source for reuse by other parts of the converter. One inherent voltage source available is the converter DC output. Hence energy recovered becomes part of the output power. No energy is wasted in sensing current flowing through the switching device and yet voltage clamping at the control terminal can also be achieved.

As said transformer is energized on the turn-on period, a reset mechanism has to be provided to allow opposite voltage at the windings in the turn-off period. A full wave rectification circuit can satisfy the condition that both positive or negative voltage across a winding can couple to said voltage source or converter output. A bridge rectifier or center tapped full wave rectifier are some of the circuits that can achieve the task. As center tapped full wave rectifier needs less diodes and produce less loss, it is preferred but full wave rectification with four diodes can also be used.

Hence, a fourth winding is added to provide a reset path for the transformer. Magnetizing energy stored in the said transformer will be released by means of current flowing through the fourth winding which is connected in series with a diode and flow to the voltage source or converter output. The phase of the third winding should be opposite to that of the fourth winding in order to make sure one winding looks after the turn-on period while the other look after the turn-off or reset period. The turns ratio of the third and fourth winding determines the maximum operating duty cycle of the switch. As a result the magnetizing energy can also be recovered and reused as needed.

The present invention has a number of features. As the driving signal of the switching device is taken from the current flow through the switch, the switch can switch on once current start to flow and turn off when the current start to flow in the reversed direction. It eliminates the problem with the prior art circuit. It takes the driving signal from the output winding voltage of a transformer which is affected by input voltage variation. In the prior art the presence of leakage inductance in the main transformer produces a time period with no driving signal for the switching devices and current is forced to flow through the body diode of the device. The power loss in that period is proportional to the magnitude of leakage inductance of the transformer, operating current and operating frequency. The loss is significant especially when this period is long compared to a switching period at high frequency. The present invention solves the problem by taking current as a control signal, existence of the leakage inductance does not affect the driving signal any more. The present invention is suitable to operate at high current at which the switching device will be turned on more effectively.

Accordingly, it is an object of the present invention to provide improved self-driven synchronous rectifier circuits for power supply apparatus.

It is another object of the present invention to use current sensing method and make the apparatus a true resemblance of a rectifier.

It is another object of the present invention to allow synchronous rectifier to operate under wide input voltage range.

It is another object of the present invention to avoid the effect of leakage inductance in the main transformer of a converter.

It is another object of the present invention to provide energy recovery by current sensing means to ensure high efficiency operation.

It is another object of the present invention to provide synchronous rectification to a wide range of power converter topologies.

It is another object of the present invention to provide synchronous rectification with simplicity and low component count.

These and other objects of the present invention will become apparent to those skilled in the art from the following detailed description of the invention and from the accompanying drawings.

DETAIL DESCRIPTION OF THE PREFERRED EMBODIMENTS

Figure 1:
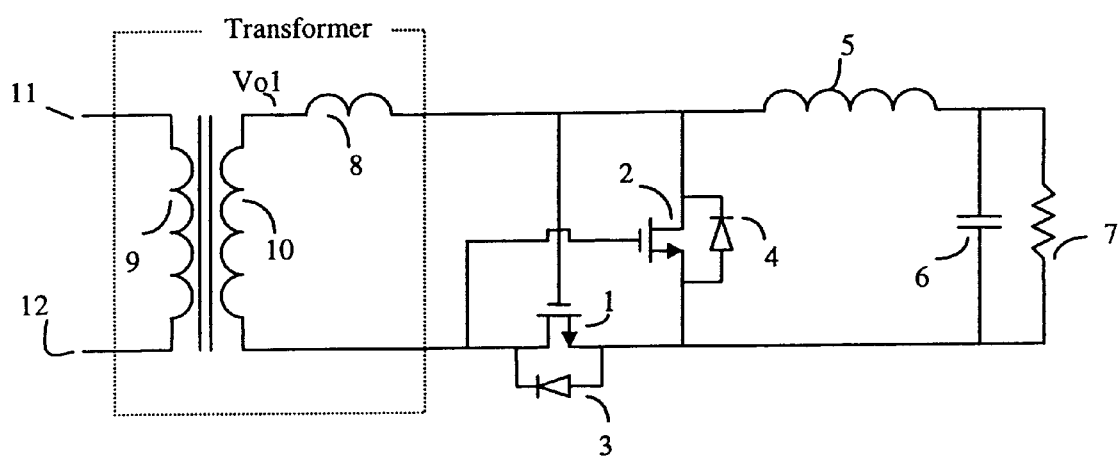
FIG. 1 (Prior Art) is a simplified equivalent circuit of self-synchronized rectifiers driven by the output voltage of a forward converter.

The features of the present invention may be better understood by means of the following description of exemplary prior art shown in FIG. 1. It shows a typical configuration for driving two synchronous rectifiers on the output stage of a typical forward type converter. It comprises of a main transformer with its primary winding 9, secondary winding 10 and output leakage inductance 8. The synchronous rectifiers are MOSFET 1 and 2, and diodes 3 and 4 are the inherent body diodes of MOSFET 1 and 2 respectively. Inductor 5 and output capacitor 6 put together an output filtering circuit. Resistor 7 is the equivalent loading resistor.

The operation of the synchronous rectifier is explained. An alternating voltage is coupled to terminals 11 and 12 of primary winding 9. A voltage will be induced in secondary winding 10. When the voltage across secondary winding 10 goes positive, current will start to flow through equivalent leakage inductor 8 from zero. At this time continuous current is flowing through output inductor 5 and diode 4. As current through equivalent leakage inductor 8 rises from zero towards the current level of inductor 5, diode 3 conducts simultaneously with diode 4. Since the gate terminals of MOSFETs 1 and 2 are connected to the drain terminals of each other, both active switches 1 and 2 are turned off with current flowing through their body diodes in this period. Body diode of MOSFET is well-known to have high forward voltage of 0.7V which is much higher than that of a MOSFET. This period becomes very dissipating. When current through diode 3 reaches the current level of inductor 5 diode 4 turns off and MOSFET 1 is allowed to turn on. Only by this time can current flow through the low-loss MOSFET 1 instead of its body diode.

When the input alternating voltage goes from positive to negative similar process will occur. When the voltage across secondary winding 10 goes from positive to negative, current flowing through equivalent output leakage inductance 8 cannot drop to zero immediately. Instead there is a period in which simultaneous conduction of MOSFET body diodes 3 and 4 occurs. In this period MOSFETs 1 and 2 are clamped off and current flows though lossy body diodes until current through leakage inductance 8 falls to zero and MOSFET 2 comes into full conduction.

The prior art synchronous rectifier so described has two major drawbacks. On one hand the simultaneous conduct periods so described reduce converter efficiency. This phenomenon is aggravated when converter switching frequency increases and the simultaneous conduction periods become a significant portion of the switching period. On the other hand, the driving signal for the two MOSFETs is dependent on the voltage across the secondary winding of the main transformer. When the supply voltage on the primary side varies over a wide range, the secondary voltage may exceed the gate voltage limit of the MOSFET, or it may be too low to turn the MOSFETs fully on. The present invention tackles, but not limit to, these problems. It can be applied to both isolating and non-isolating converters.

FIRST BASIC EMBODIMENT

Figure 2:
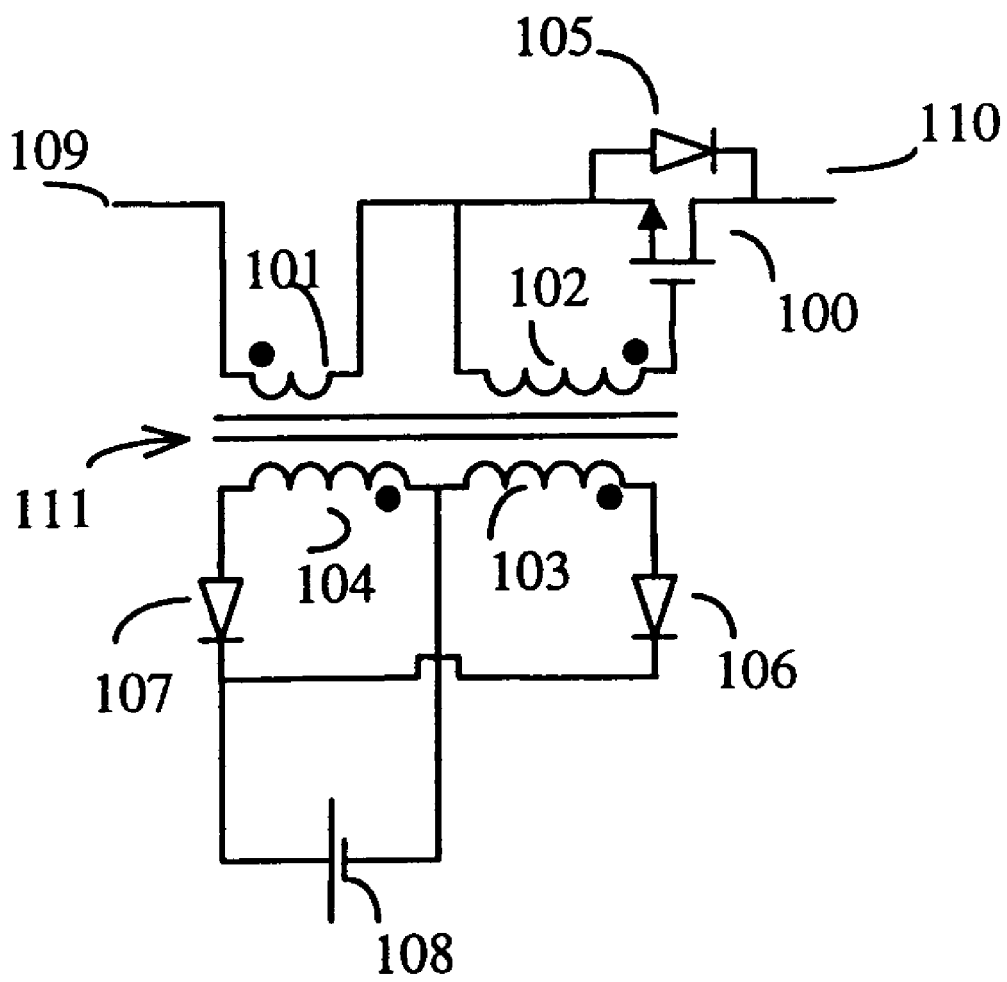
FIG. 2 is a circuit of a basic embodiment of the present invention.

FIG. 2 shows a circuit diagram of a first basic embodiment of the present invention. It comprises a MOSFET 100 as the main switch which has a parallel diode 105 with its anode connected to the MOSFET source terminal and cathode connected to the MOSFET drain terminal. This parallel diode is in general the body diode of MOSFET 100. This embodiment further comprises a transformer 111 with four windings 101–104. Winding 101 has one end coupled to a terminal 109 and the other end coupled to the source of MOSFET switch 100. Winding 102 has one end coupled to the gate terminal of MOSFET 100 and the other end to the source terminal of MOSFET 100. Winding 103 has one end coupled to the anode of a diode 106, while the other end couples to the negative terminal of a voltage source 108. Winding 104 has one end coupled to the anode of a diode 107, while the other end couples to the negative terminal of voltage source 108. Diode 106 and diode 107 have their cathodes connected together and coupled to the positive terminal of voltage source 108. A terminal 110 is coupled to the drain terminal of MOSFET 100.

Figure 3A:
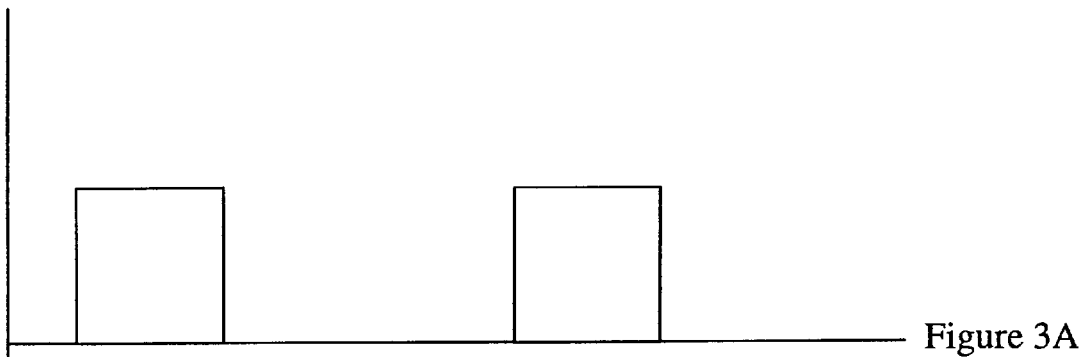
FIGS. 3A–3B are timing diagrams of operating voltage and current of the basic embodiment.
Figure 3B:
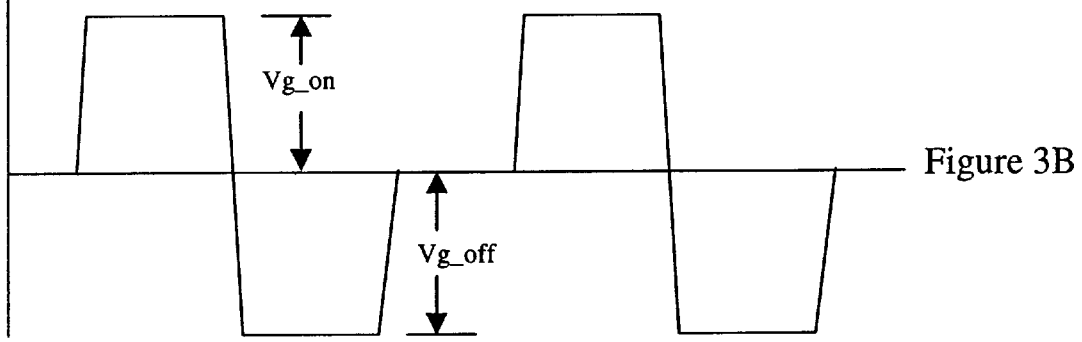

Theory of operation of the first basic embodiment is described. The basic embodiment resembles a diode with anode at terminal 109 and cathode at terminal 110. When voltage at terminal 109 is higher than that at terminal 110 by a magnitude of the forward voltage drop of diode 105, current will start to flow from terminal 109 to terminal 110 through winding 101 and body diode 105. As current flows through the current sensing winding 101 with a waveform shown in FIG. 3A, a positive voltage $Vg\_on$ will be induced at winding 102. Winding 102 is arranged so that a positive voltage is induced across the gate and source terminals of MOSFET 100 as shown in FIG. 3B. The MOSFET will be turned on and allow current flow through its low resistance channel rather than the body diode 105. The time interval between current starting to flow through the body diode and the turn on edge of the MOSFET is inversely proportional to the magnitude of the operating current, and proportional to gate charge required to turn on the MOSFET and the inherent turn on delay of the MOSFET. The driving voltage $Vg\_on$ is determined by the winding ratio of windings 103 and 102, the magnitude of the voltage source 108 and coupling coefficient of transformer 111. Winding 103 is arranged such that current induce in this winding will deliver current into voltage source 108 and the magnitude of this current is determined by the ratio of windings 101 and 103. Voltage source 108 acts as a voltage clamping facility to clamp the gate source voltage of MOSFET 100. This mechanism can also recover energy back to voltage source 108.

When current which flows from terminal 109 to terminal 110 reduces to zero, transformer 111 will reset itself and generate a negative voltage $Vg\_off$ across winding 102 and turn MOSFET 100 off as shown in FIG. 3B. The turn off voltage $Vg\_off$ is determined by the winding ratio of windings 102 and 104, the magnitude of voltage source 108 and coupling coefficient of transformer 111. Winding 104 is arranged such that current will be delivered to voltage source 108 in the resetting process and the magnitude of the current is determined by winding 104 and the magnetic properties of transformer 111.

This charging current actually recovers energy stored in transformer 111 and the gate charge of MOSFET 100 to voltage source 108.

Voltage source 108 has not been specifically identified and in fact it can be any voltage source with a constant voltage inside a converter system. One obvious voltage source is the output of a converter. Hence energy recovered from the current sense winding and the energy store in transformer 111 can be directly utilized by output loads and high efficiency can be achieved.

Although no logic circuit, timing circuit or control circuit is needed in this embodiment to generate the necessary synchronous driving signal for MOSFET 100, one may use a high speed buffer with high input impedance and low output impedance to enhance the driving signal without changing any basic operating principle of the above description.

SECOND BASIC EMBODIMENT

Figure 4:
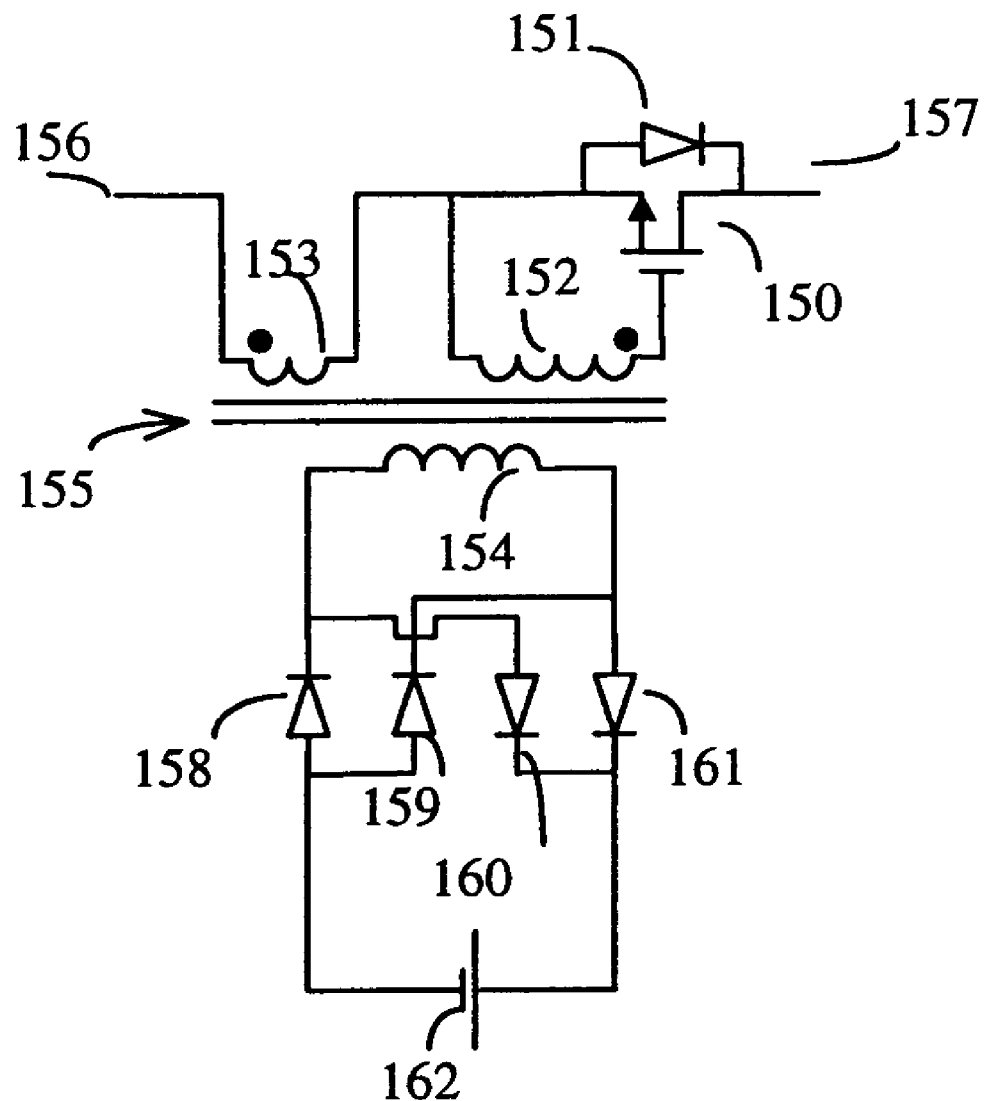
FIG. 4 is a basic embodiment with less transformer windings and more rectifying diodes.

FIG. 4 shows a circuit diagram of a second basic embodiment of the present invention. It differs from the first basic embodiment in the usage of four diodes for rectification to a voltage source. It comprises a MOSFET 150 as the main switch which has a parallel diode 151 with its anode connected to the MOSFET source terminal and cathode connected to the MOSFET drain terminal. This parallel diode is in general the body diode of MOSFET 150. A terminal 157 is coupled the drain terminal of the MOSFET. This embodiment further comprises a transformer 155 with three windings 152–154.

Winding 153 has one end coupled to a terminal 156 and the other end coupled to the source of MOSFET switch 150. Winding 152 has one end coupled to the gate terminal of MOSFET 150 and the other end to the source terminal of MOSFET 150. Winding 154 has one end coupled to the anode of a diode 161 and the cathode of a diode 159, while the other end couples to the anode of a diode 160 and the cathode of a diode 158. The anodes of diodes 158 and 159 are tied together and coupled to the negative terminal of a voltage source 162. The cathodes of diodes 160 and 161 are tied together and coupled to the positive terminal of voltage source 162.

Theory of operation of the second basic embodiment is described. This basic embodiment resembles a diode with anode at terminal 156 and cathode at terminal 157. When voltage at terminal 156 is higher than that at terminal 157 by a magnitude of the forward voltage drop of diode 151, current will start to flow from terminal 156 to terminal 157 through winding 153 and body diode 151. As current flows through the current sensing winding 153, a positive voltage will be induced at winding 152. Winding 152 is arranged so that a positive voltage is induced across the gate and source terminals of MOSFET 152. The MOSFET will be turned on and allow current flow through its low resistance channel rather than body diode 151. The time interval between current starting to flow through the body diode and the turn on edge of the MOSFET is inversely proportional to the magnitude of the operating current, and proportional to gate charge required to turn on the MOSFET and the inherent turn on delay of the MOSFET. The driving voltage is determined by the winding ratio of windings 154 and 152, the magnitude of the voltage source 162 and coupling coefficient of transformer 155. Winding 154 will deliver current to voltage source 162 and the magnitude of this current is determined by the ratio of windings 154 and 153. Voltage source 162 acts as a voltage clamping facility to clamp the gate source voltage of MOSFET 150. This mechanism can also recover energy back to voltage source 162.

When current which flows from terminal 156 to terminal 157 reduces to zero, transformer 155 will reset itself and generate a negative voltage across winding 152 and turns MOSFET 150 off. The turn off voltage is determined by the winding ratio of 152 and 154, the magnitude of voltage source 162 and coupling coefficient of transformer 155. Winding 154 will deliver current to voltage source 162 in the resetting process and the magnitude of the current is determined by winding 154 and the magnetic properties of transformer 155. This charging current actually recovers energy stored in transformer 155 and the gate charge of MOSFET 150 to voltage source 162.

Voltage source 162 can be any voltage source with a constant voltage inside a converter system. One obvious voltage source is the output of a converter. Hence energy recovered from the current sense winding and the energy store in transformer 162 can be directly utilized by output loads and high efficiency can be achieved.

Although no logic circuit, timing circuit or control circuit is needed in this embodiment to generate the necessary synchronous driving signal for MOSFET 150, one may use a high speed buffer with high input impedance and low output impedance to enhance the driving signal without changing any basic operating principle of the above description.

FIRST PRACTICAL EMBODIMENT

Figure 5:
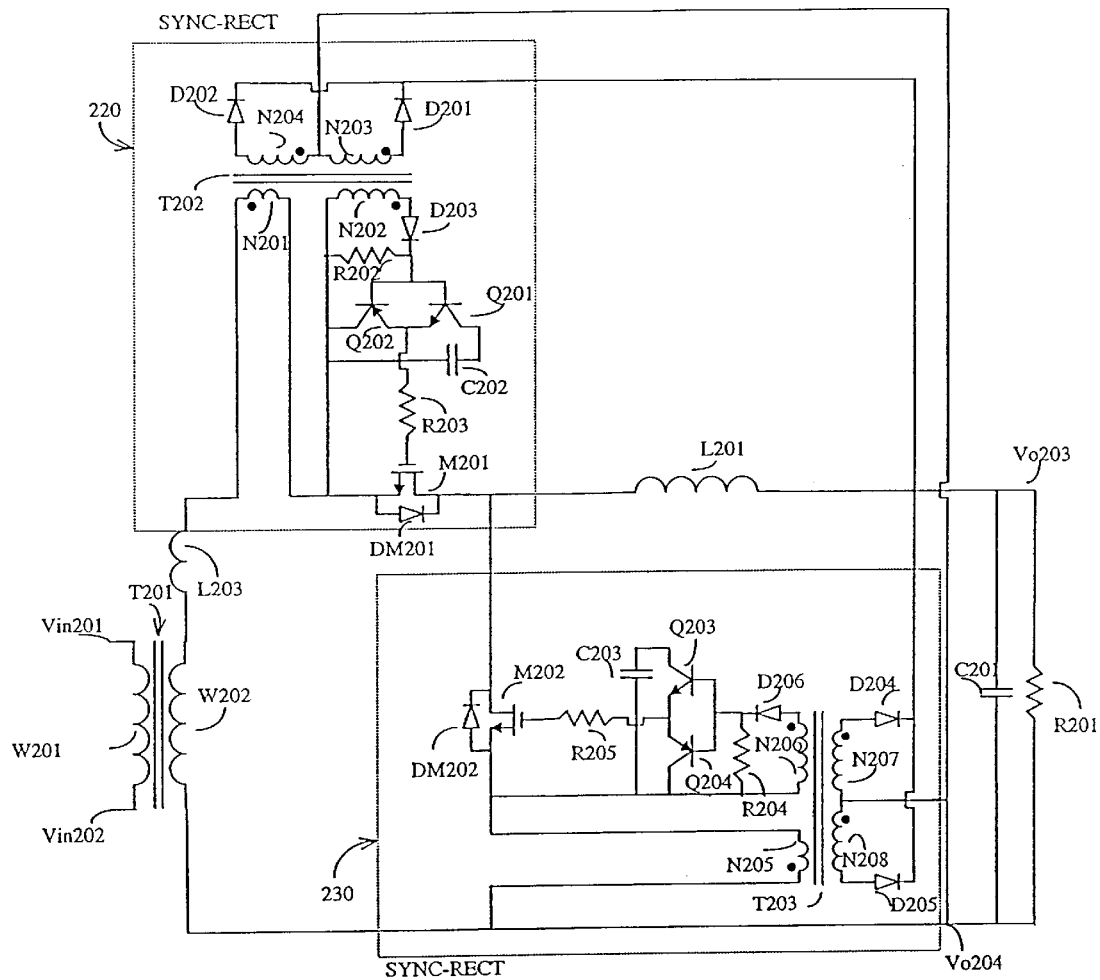
FIG. 5 is a first practical embodiment of the present invention.

FIG. 5 shows a first practical embodiment of the present invention on an isolated forward converter with half wave rectification. It comprises a transformer T201 which is the main output transformer of a forward converter which includes a primary winding W201, a secondary winding W202 and equivalent leakage inductance L203. One terminal of the secondary winding is coupled to a synchronous rectifier unit 220. This synchronous rectifier unit comprises all components described in the basic embodiment. Furthermore a buffer circuit is placed at the gate terminal of MOSFET M201 for enhancement of drive signal from winding N202. This buffer circuit comprises diode D203, resistor R202, transistors Q201 and Q202, capacitor C202 and resistor R203. Another similar synchronous rectifier unit 230 is coupled to another terminal of secondary winding W202 and synchronous rectifier unit 220. Like synchronous rectifier unit 220, synchronous rectifier unit 230 comprises all components described in the basic embodiment plus a buffer circuit which is placed at the gate terminal of MOSFET M202 for enhancement of drive signal from winding N206. This buffer circuit comprises diode D206, resistor R204, transistors Q203 and Q204, capacitor C203 and resistor R205. This embodiment also comprises a filter inductor L201 which is coupled to the synchronous rectifiers. An output filter capacitor C201 is coupled to filter L201. Output terminals Vo203 and Vo204 are coupled to capacitor C201 which is in turn connected to a load resistor R201. Terminals for connection to a voltage source in the two synchronous rectifier units are connected to output terminals Vo203 and Vo204 respectively.

It is apparent to those skilled in the art that any buffer circuit may be used in each synchronous rectifier unit to enhance gate drive signal for its MOSFET.

It is also apparent to those skilled in the art that the synchronous rectifier unit may have the configuration of the first basic embodiment or the second basic embodiment.

The operation of this embodiment during a positive cycle is described herein. An AC voltage is applied to primary winding W201 and a corresponding AC voltage is induced across secondary winding W202. Only half cycle of the AC output voltage will be rectified and filtered to provide DC output. When secondary winding W202 exhibits a positive cycle from its negative cycle, current starts to flow through winding N201 and body diode DM201. Current through winding N201 induces a voltage in winding N202. Through diode D203 this voltage drives transistor Q201 on. Capacitor C202 provides charge through Q201 and resistor R203 to the gate terminal of MOSFET M201 which is then turned on. This arrangement provides buffering effect to the driving signal in winding N202. Assume continuous current through inductor L201 current flowing through the switch M201 will ramp up while current flowing through switch M202 will ramp down correspondingly. The rate of change of current is determined by output leakage inductance L203 of transformer T201. Since both MOSFETs M201 and M202 are conducting, the secondary terminal voltage of transformer T201 is essentially zero, as most of the voltage drops across output leakage inductor L203. Nevertheless, both MOSFETs are turned on by the current through them and keep minimum voltage drop with minimal dissipation. This solves the problem of simultaneous conduction through body diodes of MOSFETs in prior art circuit configuration. After current through M201 has ramped up to the value of current level in inductor L201, current flowing through MOSFET M202 and winding N205 will drop to zero. With no current through winding N205, winding N206 cannot sustain a voltage to keep transistor Q203 turned on. Instead, resistor R204 pulls transistor Q204 on and turns transistor M202 off. In the rest of the positive cycle current flows through synchronous rectifier unit 220 until voltage at winding W202 changes.

The operation of this embodiment during a negative cycle is described herein. When secondary winding W202 exhibits a negative cycle from its positive cycle, voltage applied across the primary winding W202 is reversed. Current through MOSFET M201 decreases. However, leakage inductance L203 of the transformer T201 keeps its current in the same direction for a finite time. As a result, both MOSFETs will have current flowing while that through M201 is ramping down and that through M202 is ramping up. As both switches are turned on, voltage across the transformer secondary terminals is approximately zero. This mechanism keeps the two MOSFETs turned on and maintain minimum voltage drop and losses. This solves the problem of simultaneous conduction through body diodes. This transition period will end when current flowing in M202 ramp up to the current level of inductor L201. Current in M201 will reduce to zero and then turned off. Current will continue to flow through M202 in the rest of the negative cycle.

When the voltage across the primary winding is zero during one switching cycle, synchronous rectifier unit 203 can still drive MOSFET M202 on and take advantage of its low loss characteristics. This is because the present invention is current driven. As long as current is continuous through inductor L201 transistor M202 will be kept on. This is in contrast to prior art technology which cannot provide proper voltage drive under this condition, as no voltage is induced on secondary winding and no driving signal can be provided to the MOSFET.

With this embodiment positive cycles are rectified and produce a steady DC output voltage, it is apparent to those skilled in the art that if the MOSFETs are connected in reverse manner, negative pulse train will be form and hence resulting in negative output voltage.

Operation of embodiment is independent of input AC voltage on the transformer primary side. This is because the present invention is current driven and is not dependent on input voltage. This allows power converter to operate with high efficiency over a wide input voltage range, which is a significant advantage over prior art technology.

SECOND PRACTICAL EMBODIMENT

Figure 6:
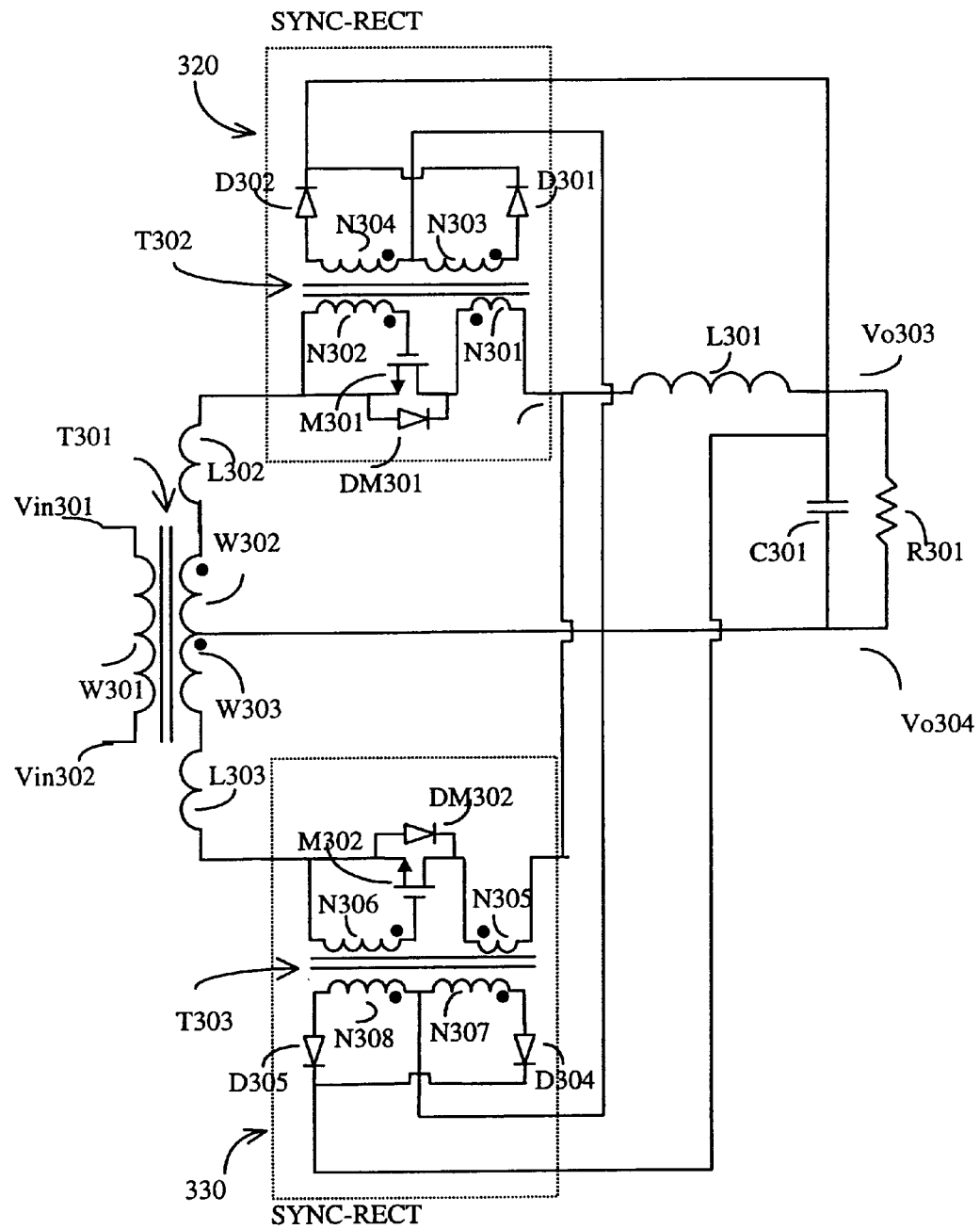
FIG. 6 is a second practical embodiment of the present invention.

FIG. 6 shows a second practical embodiment of the present invention on an isolated forward converter with center tapped full wave rectification. It comprises a transformer T301 which is the main output transformer of a forward converter which includes a primary winding W301, a first secondary winding W302 and its equivalent leakage inductance L302, and a second secondary winding W303 and its equivalent leakage inductance L303. One terminal of the first secondary winding is coupled to a synchronous rectifier unit 320. This synchronous rectifier unit comprises all components described in the basic embodiment. One terminal of the second secondary winding is coupled to another synchronous rectifier unit 330 which is in turn coupled to synchronous rectifier unit 320. These two synchronous rectifier units are coupled to a filter inductor L301 which is in turn coupled to a filter capacitor C301. One terminal of capacitor C301 is coupled to the center tapped secondary windings of transformer T301. An output terminal Vo303 is coupled to capacitor C301 and inductor L301, while another output terminal Vo304 is coupled to another terminal of capacitor C301 and the center tap of the secondary windings. The synchronous rectifiers have MOSFETs M301 and M302 as their main switching devices. Terminals for connection to a voltage source in the two synchronous rectifier units are connected to output terminals Vo303 and Vo304 respectively.

It is apparent to those skilled in the art that a buffer circuit may be used in each synchronous rectifier unit to enhance gate drive signal for its MOSFET.

It is also apparent to those skilled in the art that the synchronous rectifier unit may have the configuration of the first basic embodiment or the second basic embodiment.

The operation of this embodiment is described herein. An AC voltage is applied to primary winding W301 and a corresponding AC voltage is induced across secondary windings W302 and W303. When secondary winding W302 exhibits a positive cycle, secondary winding W303 will exhibit a negative cycle and reverse bias body diode DM302. No current flow through current sense winding N305 and MOSFET M302 is turned off. On the other hand body diode DM301 is forward biased and current flows through current sense winding N301. MOSFET M301 is turned on and current flow through this low loss device. Similarly, when secondary winding W303 exhibits a positive cycle, secondary winding W302 will exhibit a positive cycle and reverse bias body diode DM301. No current flow through current sense winding N301 and MOSFET M301 is turned off. On the other hand body diode DM302 is forward biased and current flows through current sense winding N305. MOSFET M302 is turned on and current flow through this low loss device. As a result, both positive and negative cycle are rectified as a positive voltage which is then filtered and a steady DC source is produced at the output terminals.

The voltage across the transformer primary winding may become zero in a switching cycle, the synchronous rectifier units can still function as low loss switches. Under this condition, current flowing in inductor L301 will be shared by two paths, one through MOSFET M301 and secondary winding W302, another one through MOSFET M302 and secondary winding W303. Both MOSFETs are turned on as they are current driven and conduct current in a low loss manner.

Operation of embodiment is independent of input AC voltage on the transformer primary side. This is because the present invention is current driven and is not dependent on input voltage. This allows power converter to operate with high efficiency over a wide input voltage range, which is a significant advantage over prior art technology.

THIRD PRACTICAL EMBODIMENT

Figure 7:
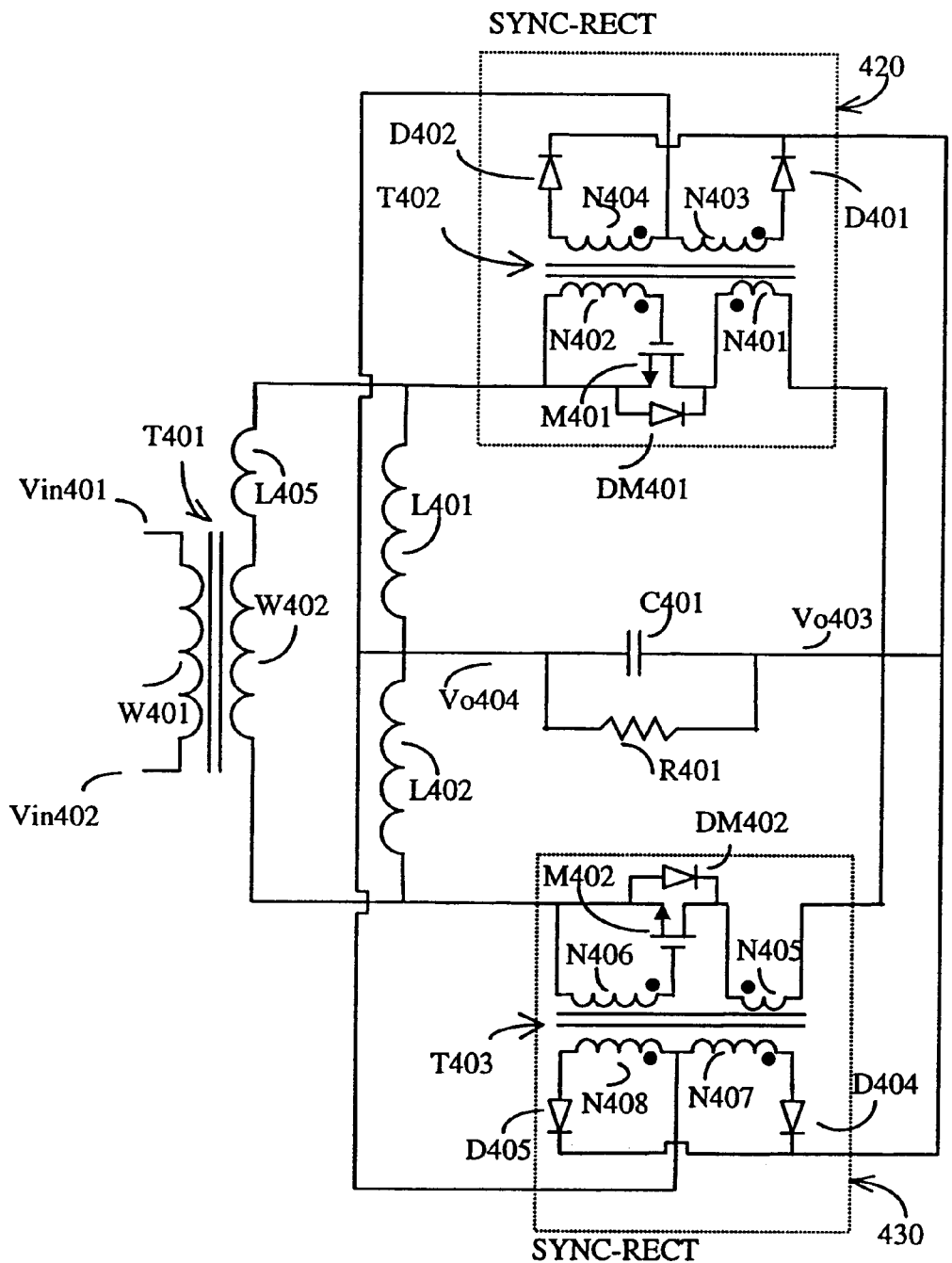
FIG. 7 is a third practical embodiment of the present invention.

FIG. 7 shows a third practical embodiment on an isolated current doubler type forward converter. It comprises a transformer T401 which is the main output transformer of a forward converter which includes a primary winding W401, a secondary winding W402 and its equivalent leakage inductance L405. One terminal of the secondary winding is coupled to a synchronous rectifier unit 420. This synchronous rectifier unit comprises all components described in the basic embodiment. The coupling point of the transformer secondary is further coupled to an inductor L401. Another terminal of the secondary winding has a symmetrical arrangement. It is coupled to another synchronous rectifier unit 430 which comprises all components described in the basic embodiment. This terminal is further coupled to an inductor L402. This inductor is coupled to inductor L401 with an output terminal Vo404. One terminal of synchronous rectifier 420 attached to winding N401 is coupled to a terminal of synchronous rectifier 430 attached to winding N405. An output terminal Vo403 is coupled to this node. An output capacitor C401 is coupled to terminals Vo403 and Vo404. These output terminals are further coupled to a load resistor R401. Terminals for connection to a voltage source in the two synchronous rectifier units are connected to output terminals Vo403 and Vo404 respectively.

It is apparent to those skilled in the art that a buffer circuit may be used in each synchronous rectifier unit to enhance gate drive signal for its MOSFET.

It is also apparent to those skilled in the art that the synchronous rectifier unit may have the configuration of the first basic embodiment or the second basic embodiment.

The operation of this embodiment is described herein. An AC voltage is applied to primary winding W401 and a corresponding AC voltage is induced across secondary winding W402. When secondary winding W402 exhibits a positive cycle, body diode DM401 is turned on. Current flowing through winding N401 and turns on a low loss MOSFET M401. Current flows through MOSFET M401 and delivers current to output load resistor R401. Diode DM402 is reversed biased and thus no current flows through MOSFET M402. The load current is shared by currents in inductors L401 and L402. When secondary winding W402 exhibits a negative cycle, body diode DM402 is turned on. Current flowing through winding N405 and turns on the low loss MOSFET M402. Diode DM401 is reverse biased and MOSFET M401 is turned off. Note that this circuit arrangement enables power to be delivered to the load attached to the output terminals in both positive and negative cycles. The voltage delivered is filtered by capacitor C401 and inductors L401 and L402. The output voltage is positive at terminal Vo403 and negative at Vo404.

The voltage across the transformer primary winding may become zero in a switching cycle, the synchronous rectifier units can still function as low loss switches. The synchronous rectifier units are current driven. As long as sufficient current flow through the switches M401 or M402, they will be turned on. Their operations are not impaired by the secondary voltage of the transformer dropping to zero or the presence of transformer leakage inductance L405.

FOURTH PRACTICAL EMBODIMENT

Figure 8:
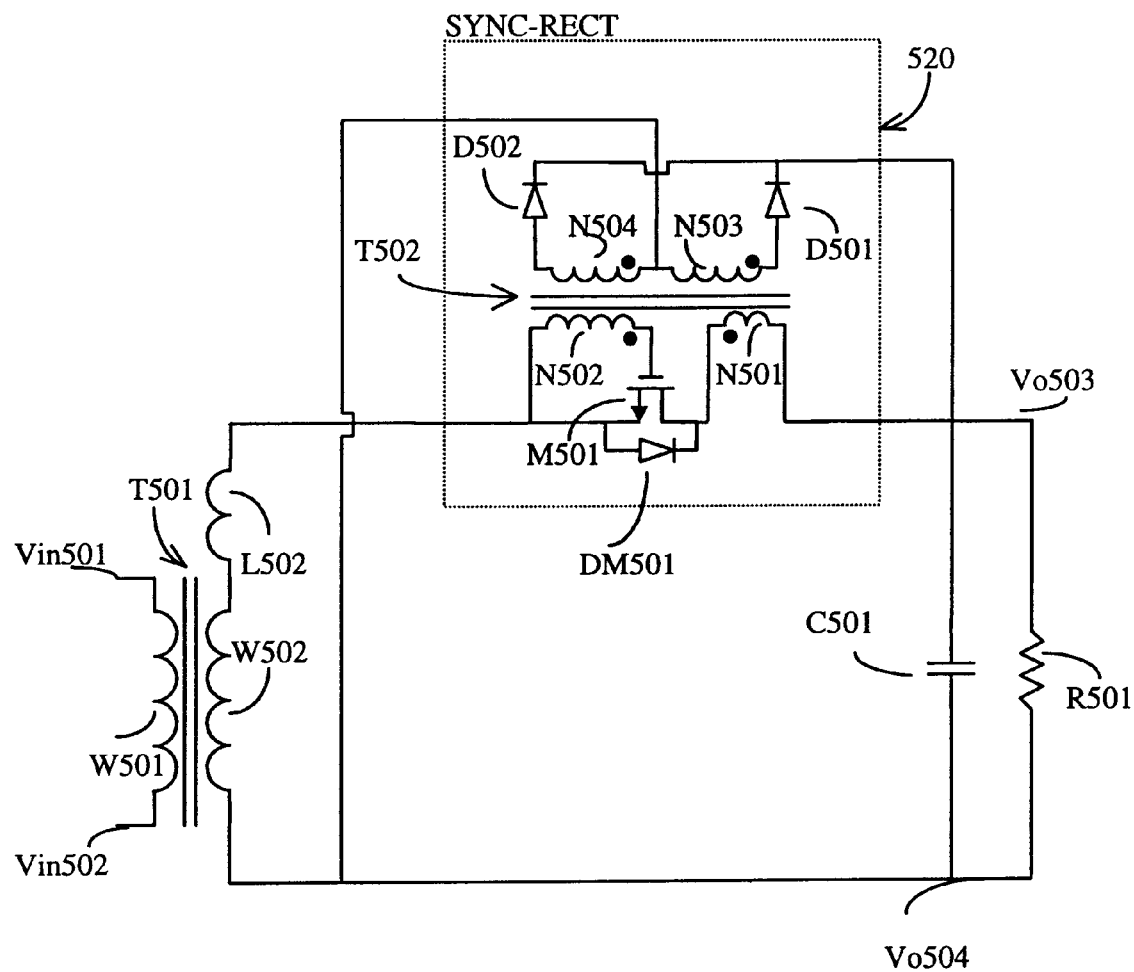
FIG. 8 is a fourth practical embodiment of the present invention.

FIG. 8 shows a fourth practical embodiment on flyback type converter. It comprises a coupled inductor T501 which includes a primary winding W501, a secondary winding W502 and its equivalent leakage inductance L502. One terminal of the secondary winding is coupled to a synchronous rectifier unit 520 which is further coupled to an output capacitor C501. Output terminals Vo503 and Vo504 are coupled to the positive and negative terminals of capacitor C501 respectively. These terminals produce a DC output for connection to a load R501. The negative terminal Vo504 is coupled to secondary winding W502. The synchronous rectifier unit 520 has its terminals for connection to a voltage source connected to output terminals Vo503 and Vo504.

It is apparent to those skilled in the art that a buffer circuit may be used in the synchronous rectifier unit to enhance gate drive signal for its MOSFET.

It is also apparent to those skilled in the art that the synchronous rectifier unit may have the configuration of the first basic embodiment or the second basic embodiment.

The operation of this embodiment is described herein. An AC voltage is applied to primary winding W501 and a corresponding AC voltage is induced across secondary winding W502. Windings W501 and W502 are arranged so that they produced voltage of opposite phase. When secondary winding W502 exhibits a positive cycle, body diode DM501 is turned on. Current flows through winding N501 and turns on a low loss MOSFET M501. Current flows through MOSFET M501 and delivers current to output load resistor R501. When secondary winding W502 exhibits a negative cycle, current tends to flow through winding N501 in an opposite direction to that in a positive cycle. MOSFET M501 is turned off and diode DM501 is reverse biased. Current ceased to flow unit the next cycle. Similar to operations in other embodiments the synchronous rectifier provides energy recovery for high efficiency operations.

EXPERIMENTAL RESULT

The present invention is experimentally tested using a forward converter. Two experiments were carried out. In one experiment the secondary section of the forward converter comprised of Schottky diode of type MBR1645, which is a 16A, 45V device. In another experiment the secondary section comprised of the present invention as synchronous rectification units. The switching devices in the synchronous rectification units are MOSFET of type SGS60NE03L-10 which has turn on resistance of 10 milli-ohm. The converter operates under the same condition with a load current of 4 A. In both cases the temperature rise of the devices were recorded. It was recorded that the temperature rise for the Schottky diode was 27 degree C. whereas the temperature rise for the MOSFET was only 6 degree C. These two types of devices have the same package type TO220. This experiment verified the effectiveness of the present invention.

While the invention has been described in connection with what is presently considered to be the most practical and preferred embodiments, it is to be understood that the present invention is not limited to the disclosed embodiments but on the contrary is intended to cover various modifications and equivalent arrangements included within the scope of the appended claims.

What is claimed is:

1. A rectifier apparatus for rectifying current in a selected branch of a circuit, comprising:
    a switch device including a control terminal, a first switch terminal and a second switch terminal;
    a first diode with its anode connected to said first switch terminal and its cathode connected to said second switch terminal;
    an input terminal;
    an output terminal attached to a node joining the cathode of said first diode and second switch terminal of said switch device;
    a transformer comprising a plurality of windings each with two terminals;
    a first winding of said transformer attached to said input terminal;
    a second winding of said transformer has one of its terminals connected to a terminal of said first winding and another terminal coupled to the control terminal of said switch device;
    a third winding of said transformer and a fourth winding of said transformer connected together at a node;
    a second diode having its anode connected to said third winding;
    a third diode having its anode connected to said fourth winding;
    a positive terminal which couples the cathodes of said second diode and said third diode together;
    a negative terminal connected to said node joining said third winding and fourth winding;
    said positive terminal and said negative terminal being attached to a voltage source;
    magnetic means to couple the first, second, third and fourth windings of said transformer such that when said switch turns on energy is transferred from said first winding to said third winding while voltage across said second winding is kept substantially constant by said voltage source during this on period; and
    magnetic means to couple magnetizing energy of said transformer to said voltage source through said fourth winding when said switch turns off while voltage across said second winding is dept substantially constant by said voltage source during this off period.

2. A rectifier apparatus for rectifying current in a selected branch of a circuit, comprising:
    a switch device including a control terminal, a first switch terminal and a second switch terminal;
    a first diode with its anode connected to said first switch terminal and its cathode connected to said second switch terminal;
    an input terminal;
    an output terminal attached to a node joining the cathode of said first diode and second switch terminal of said switch device;
    a transformer comprising a plurality of windings each with two terminals;
    a first winding of said transformer attached to said input terminal;
    a second winding of said transformer has one of its terminals connected to a terminal of said first winding and another terminal coupled to the control terminal of said switch device;
    a third winding of said transformer with two terminals;
    a second diode having its cathode connected to a first terminal of said third winding of said transformer;
    a third diode having its anode connected to said first terminal of said third winding of said transformer;
    a fourth diode having its cathode connected to a second terminal of said third winding of said transformer;
    a fifth diode having its anode connected to said second terminal of said third winding of said transformer;
    a positive terminal which couples the cathodes of said third diode and said fifth diode together;
    a negative terminal which couples the anodes of said second diode and said fourth diode together;
    said positive terminal and said negative terminal being attached to a voltage source;

magnetic means to couple the first, second, third and fourth windings of said transformer such that when said switch turns on energy is transferred from said first winding to said third winding while voltage across said second winding is kept substantially constant by said voltage source during this on period; and magnetic means to couple magnetizing energy of said transformer to said voltage source through said third winding when said switch turns off while voltage across said second winding is dept substantially constant by said voltage source during this off period.

3. A power converter comprising a plurality of rectifier apparatus as claimed in claim 1 or 2, further comprising the converter is connected to operate as a forward type converter.

4. A power converter comprising a plurality of rectifier apparatus as claimed in claim 1 or 2, further comprising the converter is connected to operate as a forward type converter with a center tapped secondary winding.

5. A power converter comprising a plurality of rectifier apparatus as claimed in claim 1 or 2, further comprising the converter is connected to operate as a current doubler type forward converter.

6. A power converter comprising a rectifier apparatus as claimed in claim 1 or 2, further comprising the converter is connected to operate as a flyback type converter.

* * * * *

UNITED STATES PATENT AND TRADEMARK OFFICE
CERTIFICATE OF CORRECTION

| | | |
|---|---|---|
| PATENT NO. | : 6,134,131 | Page 1 of 1 |
| APPLICATION NO. | : 09/267828 | |
| DATED | : October 17, 2000 | |
| INVENTOR(S) | : Ngai Kit Franki Poon et al. | |

It is certified that error appears in the above-identified patent and that said Letters Patent is hereby corrected as shown below:

\*\* On Title page; item [75] Inventors, please change the name of the first inventor form "Ngai Kit Frankie Poon" to --Ngai Kit Franki Poon--. \*\*

Signed and Sealed this

Seventh Day of August, 2007

JON W. DUDAS
*Director of the United States Patent and Trademark Office*